United States Patent [19]

Noguchi

[11] Patent Number: 4,505,566

[45] Date of Patent: Mar. 19, 1985

[54] RANGE FOCUSING SYSTEM FOR A CAMERA

[75] Inventor: Michihiro Noguchi, Akishima, Japan

[73] Assignee: Konishiroku Photo Industry Co., Ltd., Tokyo, Japan

[21] Appl. No.: 579,358

[22] Filed: Feb. 13, 1984

[30] Foreign Application Priority Data

Feb. 16, 1983 [JP] Japan .................................. 58-25093

[51] Int. Cl.³ .............................................. G03B 13/18
[52] U.S. Cl. .................... 354/400; 354/403; 354/195.12
[58] Field of Search ............ 354/400, 402, 403, 195.12

[56] References Cited

U.S. PATENT DOCUMENTS

| | | | |
|---|---|---|---|
| 4,214,829 | 7/1980 | Ohashi | 354/195.12 |
| 4,277,158 | 7/1981 | Zawodny | 354/195.12 |
| 4,336,988 | 6/1982 | Johnson | 354/195.12 |

*Primary Examiner*—Russell E. Adams
*Attorney, Agent, or Firm*—James E. Nilles

[57] ABSTRACT

A camera provided with a fixed focusing lens as a main photographic wherein a range finder is provided for setting at two distances, an oscillating lever is provided so as to dispose an attachment lens for short range photography in front of the main photographic lens by a cam gear actuated by a release signal and rotating one turn to stop, and a holding mechanism is provided to hold the oscillating lever in the state where the attachment lens is in front of the main photographic lens when a short range signal is issued from the range finder. The shutter cocking and exposure control can be effected by the cam gear.

4 Claims, 7 Drawing Figures

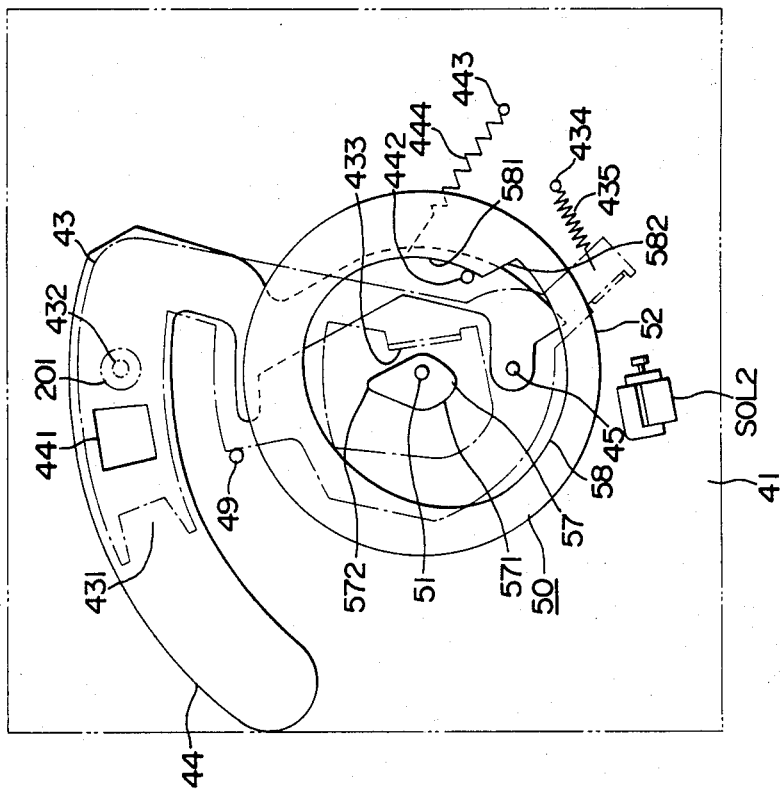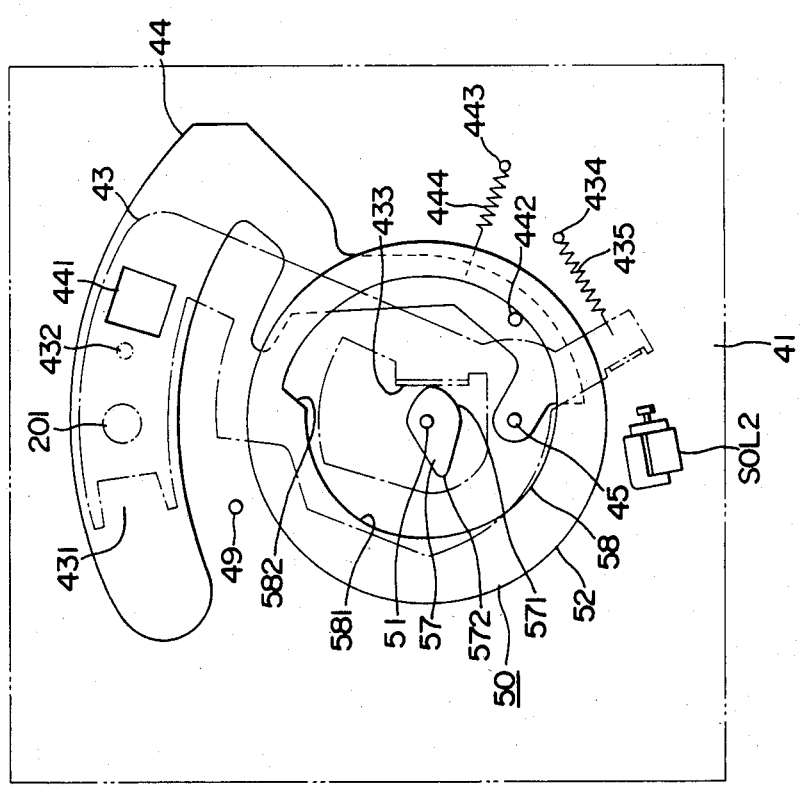

RANGE FOCUSING SYSTEM FOR A CAMERA

BACKGROUND OF THE INVENTION

1. Field of the Invention

This invention relates to a miniature camera provided with a range finder and using a fixed focusing lens for which a range from infinity to several meters is ensured, which is also capable of photographing an object at close range falling outside the depth of field, according to range information.

2. Description of the Prior Art

Cameras using a fixed focusing lens for the photographic lens are well known, however, while such cameras have the advantage of not requiring to be focused within the depth of field of the photographic lens and thus fill an essential purpose of the camera of allowing instantaneous shooting, the inconvenience of not being able to take close-range pictures is unavoidable. Accordingly, a type of camera which allows placing an attachment lens for close range photography in front of the fixed focusing lens has appeared recently.

However, the decision of whether or not to place the attachment lens in front of the main lens depends on visual measurements by the photographer. Therefore, not only could the photographer make an erroneous visual measurement, but could also forget to place the attachment lens in front of the main lens for close range photography.

On the other hand, there are automatic focusing cameras provided with a range finder which controls the photographic lens according to range information. However, this type of camera is complicated in structure.

SUMMARY OF THE INVENTION

In view of the above point, this invention provides a miniature camera using a fixed focusing lens for the main photographic lens, and which provides an attachment lens automatically in front of the main photographic lens when needed for close range photography and which is simple in construction.

This invention attains the above object by providing a camera with a range finder for two distances, and which provides an oscillating lever which moves an attachment lens for short range photography in front of the main photographic lens by a cam gear actuated by a release signal which rotates one turn to stop, and a mechanism for holding the oscillating lever in the state where the attachment lens is in front of the main photographic lens when a short range signal is issued from the range finder.

Other objects and features of this invention will be described with reference to the accompanying drawings of embodiments thereof.

BRIEF DESCRIPTION OF THE DRAWINGS

FIGS. 3(a), 3(b) represent two modes of an exposure controlling unit;

DESCRIPTION OF THE PREFERRED EMBODIMENTS

Figure 1:
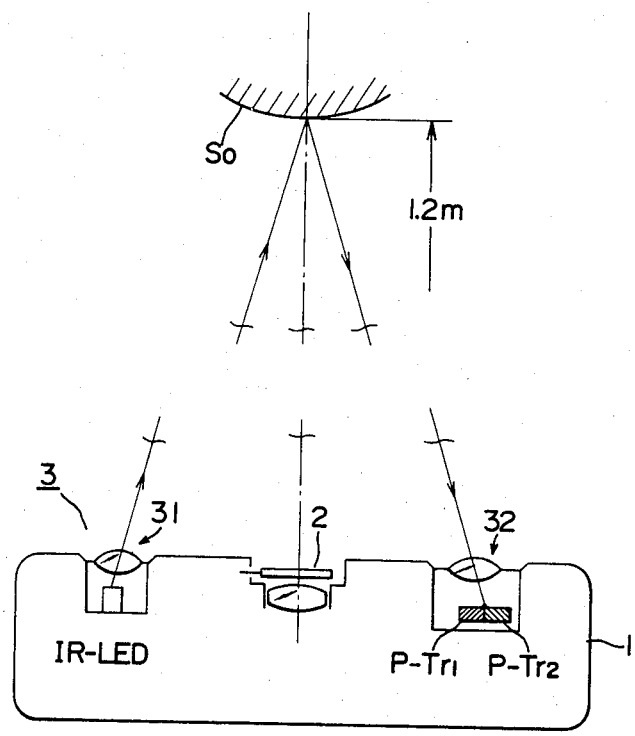
FIG. 1 represents the range finding unit of a camera given in one embodiment of this invention.

FIG. 1 represents one embodiment of a range finding unit of a camera, wherein a camera 1 has an optical system 2 on its front face and a photometric unit 3 consisting of a light emitting part 31 and a light receiving part 32 nearby. An infrared pulse coming out of a light emitting diode IR-LED of the light emitter 31 reflects on a subject $S_0$ and forms an image on a light receiving element of the light receiving part 32. Two phototransistors $P-Tr_1$, $P-Tr_2$ having nearly identical properties are provided adjacent on the light receiver 32, and the arrangement is such that the reflected light is mostly received by the phototransistor $P-Tr_1$ when the subject is within a long range bounded at 1.2 m, but is mostly received by the phototransistor $P-Tr_2$ when it is within the shorter range, thereby finding a range between two spots in the field.

Figure 2:
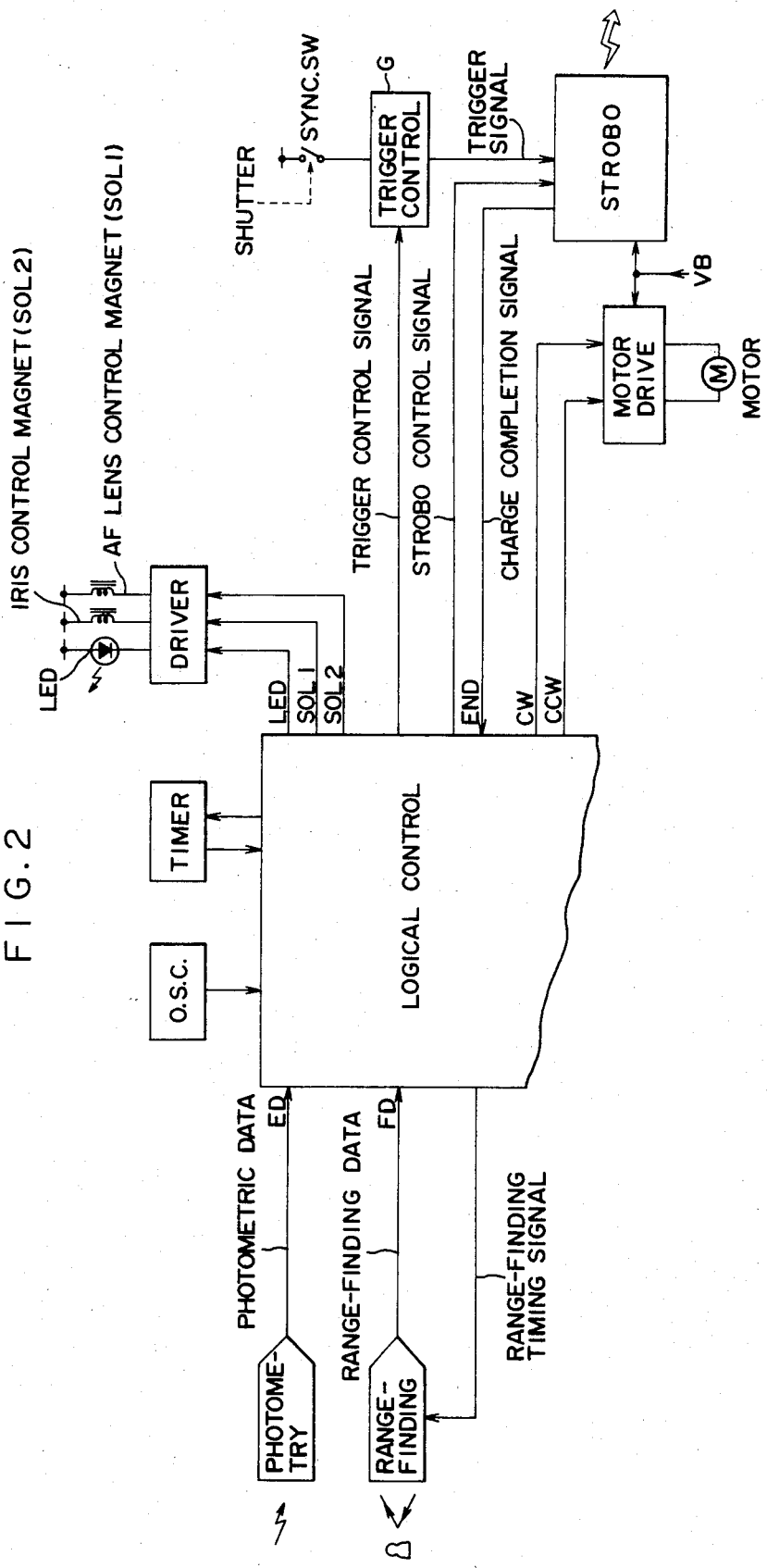
FIG. 2 is a system block diagram of the camera.

FIG. 2 is a system block diagram of the camera wherein a range-finding circuit using a comparator chooses one of the two spots in the field from a signal from the light receiver 32, and if it is decided to be within 1.2 m as above, an AF lens controlling magnet is actuated by a driver circuit and the attachment lens is kept in front of the photographing lens. Then, photometric data obtained through a photometric circuit is subjected to exposure control in two stages by a logical control circuit and the driver circuit, and an iris controlling magnet finetunes the aperture.

This invention requires a large-sized magnet when using magnetic force or the like for directly providing a support member on which the attachment lens is mounted in front of the main photographic lens; a cam gear driven by a motor is therefore provided separately to cope with consumption of an appreciable quantity of electricity. The support member is moved with the cam gear, the attachment lens is moved in front of the main lens and then withdrawn for the exposure. In the case of a close range shot, the attachment lens is held by magnetic force in front of the main lens, so that less electricity will be required for holding the lens in place. Likewise for exposure adjustment, the iris blades are adjusted by a cam gear between the fully-stopped and the un-stopped positions, and when the lens is fully-open, the blades are held open by magnetic force. Thus the camera is held ready for automatic focusing and exposure control with a minimum of power consumption. Both operations are performed by the same cam gear rotated on a release operation, so the exposure controlling unit will be described first and then the control of the photographic lens of this invention will be taken up.

FIGS. 3(a), 3(b) represent the exposure controlling unit, wherein FIG. 3(a) shows the state where the exposure has been made, and FIG. 3(b) shows the state where the shutter has been stopped-down. With the same shaft working as a turning shaft, exposure is carried out by a first blade and a second blade operated by the above-mentioned cam.

In FIG. 3 (a), a first blade 43 having a closing to cover an opening 201 of a photographic lens provided on a shutter baseplate 41 and provided with an un-stopped opening 431 on the extension thereof and a fully-stopped opening 432 on the counter side, and a second blade 44 provided with a closing to cover the opening 201 and an exposure hole 441 on the extension thereof are provided rotatably with a fixed shaft 45 on the shutter baseplate 41 working as a common shaft.

Tension springs 435 and 444 are laid between blades and fixed pins 434 and 443 to energize the first blade 43 counter-clockwise and the second blade 44 clockwise respectively.

On the other hand, a cam gear 50 having an outside cam 57 and an inside cam 58 and further a circumferential cam 52 for actuating the attachment lens which will be described later is coupled rotatably to a separate fixed shaft 51 on the shutter baseplate 41. The outside cam 57 is in contact with a bend 433 of the first blade 43, and the inside cam 58 is in contact with a pin 442 on the second blade 44.

In the state shown in FIG. 3(a), when a release button (not illustrated) is depressed, the cam gear 50 starts rotating counterclockwise according to the action of a motor. Since the first blade 43 is kept still for a certain period of time by a circular plane 571 of the outside cam 57, the second blade 44 turns counterclockwise against the tension spring 444 across an inclined plane 581 of the inside cam 58, and the exposure hole 441 comes to position leftward across the opening 201. A projection 572 of the outside cam 57 successively pushes the bend 433 of the first blade 43 to move, therefore the first blade 43 rotates clockwise against the tension spring 435, and the un-stopped opening 431 arrives at the opening 201. Further, when the outside cam 57 rotates counterclockwise, the first blade 43 again rotates counterclockwise, and thus the first blade 43 comes in contact with a stop pin 49 keeping the stopped-down opening 432 positioned over the opening 201. In this case, the pin 442 of the second blade 44 stops near the end of the inclined plane 581 of the inside cam 58 as shown in FIG. 3(b).

Where the cam gear 50 keeps rotating counter-clockwise further from the state of FIG. 3(b), the pin 442 of the second blade 44 moves along a stage 582 of the inside cam 58 according to the action of the tension spring 444, thus rotating the second blade 44 clockwise, and the exposure hole 441 moves rightward across the opening 201 formed by the stopped-down opening 432 of the first blade 43, thus ending the exposure.

Figure 4A:
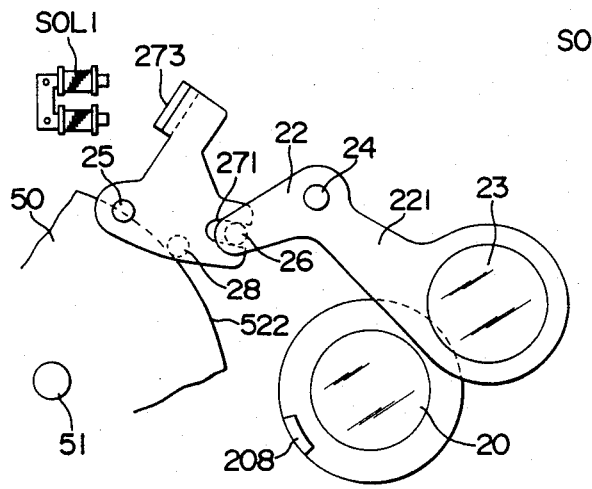
FIGS. 4(a), 4(b) represent two modes of an AF controlling unit.
Figure 4B:
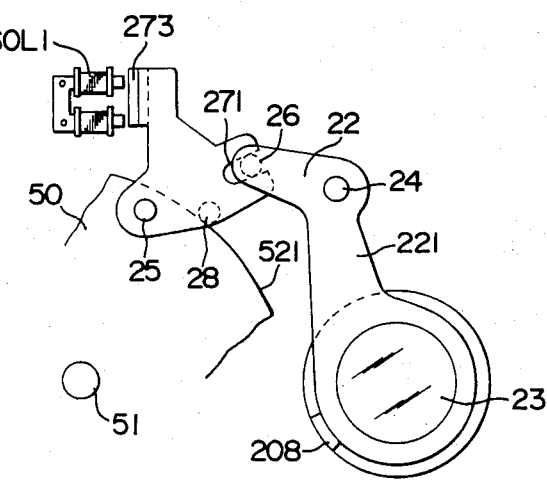
Figure 5:
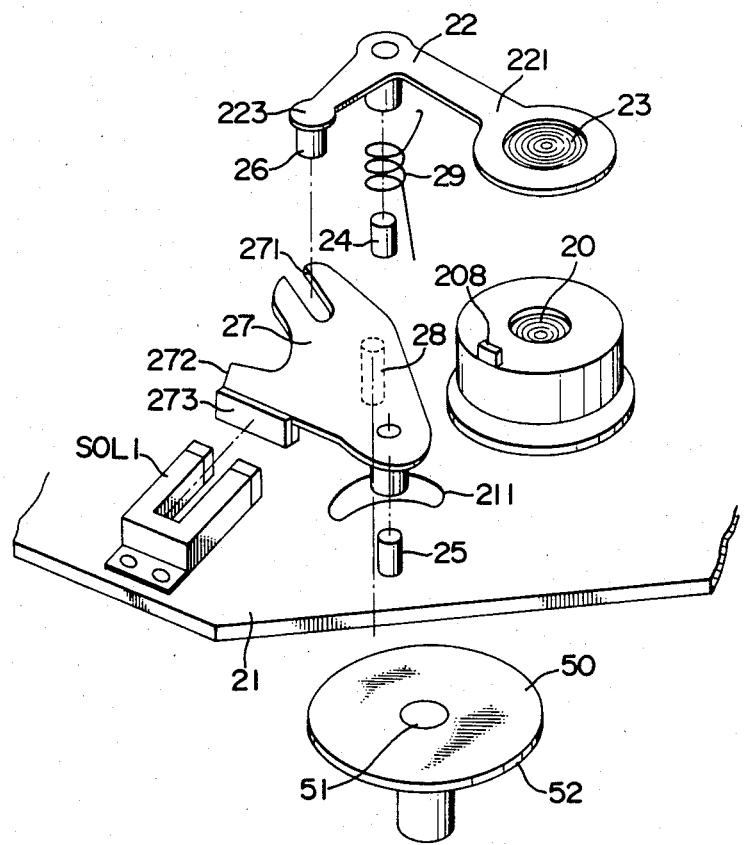
FIG. 5 is an exploded perspective view of the AF controlling unit.

The cam gear 50 continues rotating after the exposure is over and reverts to the initial state shown in FIG. 3(a). When the un-stopped opening 431 of the first blade 43 reaches the opening 201, the first blade 43 will be kept at that position by a magnet SOL2, thereby carrying out the exposure through the opening 201. An exposure control apparatus taking the exposure in two stages as described above is actuated by the cam gear 50 rotated one turn by depressing the shutter release button and the aperture control magnet SOL2 by way of the driver circuit. The operation moving the automatic focusing attachment lens described next in front of the fixed focusing lens is also carried out by the circumferential cam 52 provided on the outer periphery of the cam gear 50 rotated one turn by depressing the shutter release button and an AF controlling magnet SOL1 by way of the driver circuit depending on information from the range finding unit 3. FIGS. 4(a), 4(b) and FIG. 5 represent an AF controlling unit, wherein FIG. 4(a) shows the status during long range photography, FIG. 4(b) shows the state where an attachment lens is placed in front of the fixed focus photographic lens 20 for short range photography, and FIG. 5 shows an exploded perspective view of the AF controlling unit.

In these Figures, cams for exposure control such as outside cam 57 and inside cam 58 shown in FIG. 3(a) and FIG. 3(b) are omitted.

A reference numeral 21 denotes a lens baseplate, and there is a lens body in which the photographing lens 20 is installed in front of the lens baseplate 21. Then, 22 denotes an oscillating lever mounted rotatably on a shaft 24 provided vertically on the lens baseplate 21, and the oscillating lever 22 is provided with an arm 221 on which a close range attachment lens 23 is installed. A numeral 26 denotes a pin provided on one end 223 of the oscillating lever 22.

The pin 26 is inserted into a groove 271 provided on the nose of a fork lever 27 mounted rotatably on a shaft 25 provided vertically on the lens baseplate 21. There is present a rising part 272 on one end of the fork lever 27, and an iron piece 273 is mounted thereon. Then, 28 denotes a pin provided on the fork lever 27, and the pin 28 projects to the rear of the lens baseplate 21 through an arcuate slot 211 provided in the lens baseplate 21.

The oscillating lever 22 is energized counterclockwise by the tension of a lever spring 29 provided on the shaft 24, the fork lever 27 sliding with the pin 26 of the oscillating lever 22 via the groove 271 is rotated clockwise around the shaft 25. The pin 28 provided on the fork lever 27 is pressed to contact the circumferential cam 52 provided on an outer periphery of the cam gear 50.

The cam gear 50 stops per revolution, and the circumferential cam 52 moves between a maximum radius 521 and a minimum radius 522. The oscillating lever 22 is oscillated through the pin 28 pressed in contact with the circumferential cam 52, thereby moving the attachment lens 23 in front of the photographic lens 20.

When the shutter release button is depressed, the pin 28 is pressed to contact the circumferential cam 52 at the minimum radius 522 or its neighborhood, and the attachment lens 23 is kept away from the main photographic lens 20, or the position for long range photography. (FIG. 4(a))

Next the cam gear 50 rotates counterclockwise, and the circumferential cam 52 develops to the maximum radius 521. Here, the pin 28 is pushed upward, and the attachment lens 23 is positioned in front of the main lens 20. Then, if the range finding unit 3 generates a short range signal, a mechanism to hold the fork lever 27 is actuated by the magnet SOL1 conducting in this embodiment. In this case, the oscillating lever 22 comes in contact with a stopper 208 provided on the body of the main lens 20, and the optical axis of both the lenses 20, 23 coincide accurately with each other. (FIG. 4(b))

The cam gear 50 further rotates counterclockwise, and the circumferential cam 52 comes near the position of the minimum radius 522. When the fork lever 27 is held by the holding mechanism, the attachment lens 23 is retained in front of the main lens 20 as in FIG. 4(b). On the other hand, when the range finding unit 3 generates a long range signal, the holding mechanism is not actuated, and the attachment lens 23 is kept away from the main photographic lens 20 as in FIG. 4(a). In this state lens-stopping is carried out with the exposure controlling apparatus, and the cam gear completes one revolution correctly.

In this embodiment, the attachment lens 23 is bonded and mounted on the oscillating lever 22, however, when the mounting angle is deviated from by complicated mounting work, coincidence in optical axis with the photographing lens 20 cannot be secured. Accordingly, a unification of the attachment lens 23 and the oscillating lever 22 by molding with a transparent material like, a clear acrylic resin may improve precision to say nothing of reasonable cost.

As described above in detail, in a camera using a fixed focusing lens for its photographic lens occording to this invention, an attachment lens for short range photography is provided automatically in front of the photographing lens at the time of exposure when the subject falls within a short range that is outside the depth of field of the main photographic lens and is so held. Therefore a photographer can take a picture in focus simply by pressing the shutter regardless of range.

Further in this invention, an oscillating lever with the attachment lens installed thereon is actuated by a release signal at every revolution of a cam gear stopping through one revolution. The attachment lens is moved in front of the photographic lens, and is so held if a short range signal is issued at this point in time but made to move away from the photographic lens in the absence of the signal. Thus the attachment lens can be controlled accurately and securely to advantage.

What is claimed is:

1. A camera provided with a fixed focusing lens as a main photographic lens comprising:
   a range finder set at two distances;
   an attachment lens for short range photography;
   an oscillating lever provided with said attachment lens;
   a cam gear which is rotated one turn on a release signal and which gear disposes said attachment lens in front of said main photographic lens by oscillating said lever during its one turn; and a holding mechanism to hold the oscillating lever in the state where the attachment lens is in front of the main photographic lens when a short range signal is issued from the range finder.
2. The camera as defined in claim 1, wherein shutter cocking and exposure control can also be effected by said cam gear.
3. The camera as defined in claim 1, wherein said attachment lens and said oscillating lever are formed integrally.
4. The camera as defined in claim 2, wherein said attachment lens and said oscillating lever are formed integrally.

* * * * *